United States Patent [19]  
Berry

[11] 4,102,060  
[45] Jul. 25, 1978

[54] TEACHING AID FOR READING AN HOROLOGICAL CLOCK

[76] Inventor: Ronald G. Berry, R.R. #2, Columbia City, Ind. 46725

[21] Appl. No.: 752,434

[22] Filed: Dec. 20, 1976

[51] Int. Cl.² ............................................. G09B 19/12
[52] U.S. Cl. ........................................................ 35/39
[58] Field of Search ................. 35/39; 58/106, 126 R, 58/126 A, 127 R, 53

[56] References Cited

U.S. PATENT DOCUMENTS

| | | | |
|---|---|---|---|
| 1,143,519 | 6/1915 | Edmiston | 35/39 |
| 2,132,051 | 10/1938 | Schuttenberg | 58/127 R |
| 2,631,386 | 3/1953 | Zalkind | 35/39 |
| 2,655,739 | 10/1953 | Wilmington | 35/39 |
| 2,919,538 | 1/1960 | Eichholz | 58/106 |
| 3,203,115 | 8/1965 | Friday | 35/39 |
| 3,364,599 | 1/1968 | Polsky | 35/39 |
| 3,508,350 | 4/1970 | Genin | 35/39 |
| 3,670,428 | 6/1972 | Hall | 35/39 |
| 3,690,021 | 9/1972 | Glass et al. | 35/39 |

Primary Examiner—William H. Grieb  
Attorney, Agent, or Firm—Albert L. Jeffers

[57] ABSTRACT

A first shaft is rotatably supported centrally of a clock face having horological divisions placed in sequential arcuate relation thereon. A second shaft concentric with said first shaft is rotatably supported independently of said first shaft and has attached thereto a minute hand. A first disc is in rotatably driven relation to the first shaft and is positioned nextly adjacent the back side of the clock face. The first disc carries a first set of digital numerals corresponding to the hourly horological division. The clock face has a window formed thereon and the digital numerals are registrable with the window and viewable therethrough. A second disc having a diameter an increment larger than the diameter of the first disc is rotatably driven by the second shaft and carries a second set of digital numbers corresponding to the horological minute division. The second set of numbers is registrable with the clock face window and viewable therethrough.

3 Claims, 9 Drawing Figures

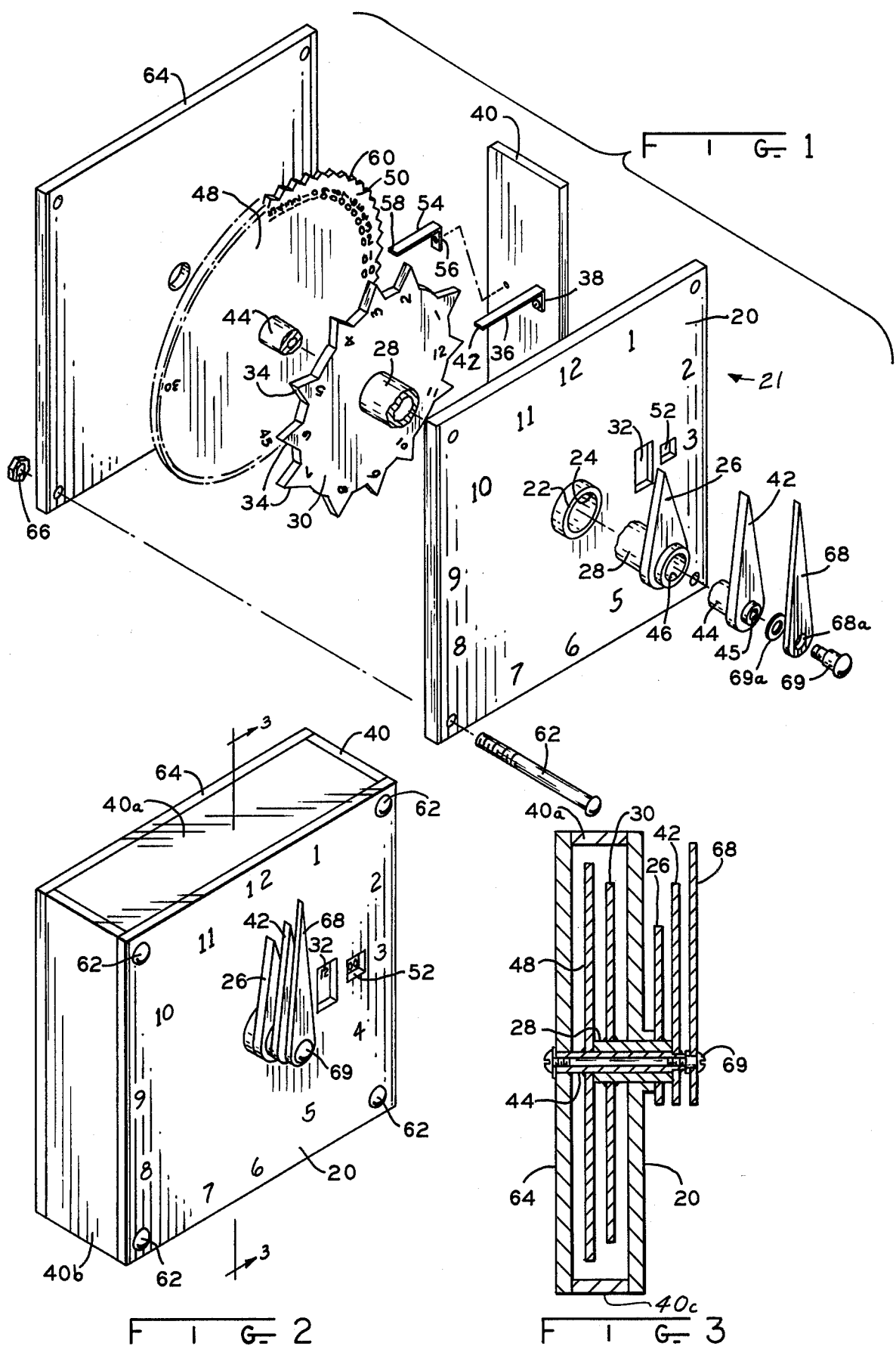

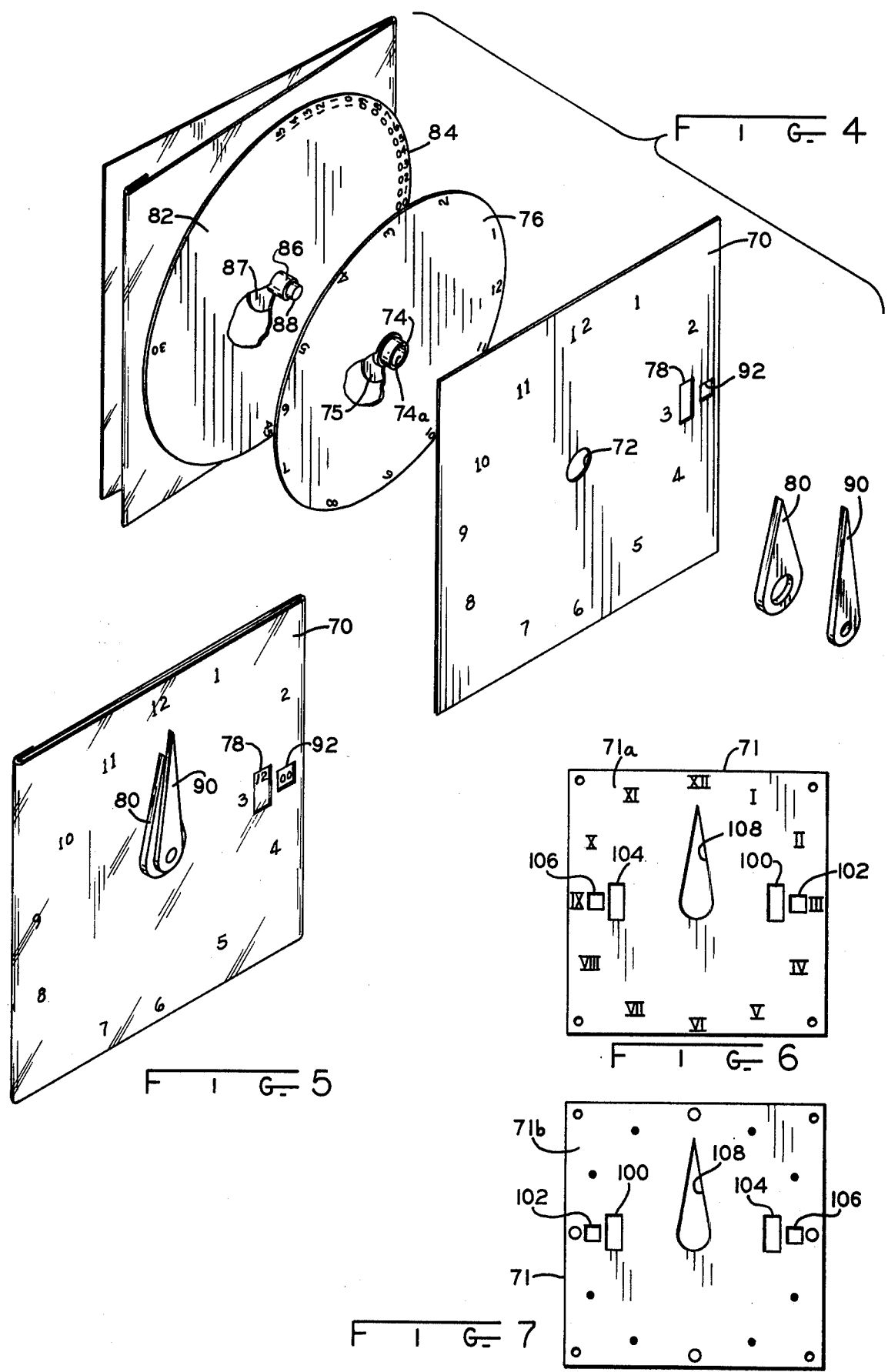

TEACHING AID FOR READING AN HOROLOGICAL CLOCK

BACKGROUND OF THE INVENTION

1. Field of the Invention

This invention relates to teaching aids for reading a horological clock and more particularly is designed to present a digital indication representing the positions of the hour and minute hands in such a clock.

2. Description of the Prior Art

Numerous teaching aids for reading an horological clock are available. These aids primarily utilize fixed dial faces which respectively have hour and minute numeral designations thereon, which may be selectively unmasked, to numerically indicate to the student the position of the hour and minute hands. However, these aids do not place at a fixed readout position, the numerical minute and hour readings corresponding to the position of the hands and therefore the teaching result is less thorough and is not easily retained by the student.

SUMMARY OF THE INVENTION

A clock face is provided with horological divisions placed in sequential and circular relation thereon. A first shaft is attached to an hour hand and is rotatably supported centrally of the divisions on said face. A second shaft is concentrically mounted relative the first shaft and is rotatably supported independently of the first shaft and carries a minute hand. A first disc is rotatably driven by the first shaft and is positioned immediately behind the clock face. The first disc carries a first set of digital numerals corresponding to the hourly horological divisions which are registrable with and viewable through a window formed in the clock face. A second disc having a diameter an increment larger than the diameter of the first disc is rotatably driven by the second shaft and carries at its periphery a second set of digital numerals corresponding to horological minute divisions which are registrable with the clock face window and viewable therethrough. The first disc has a plurality of radially extending projections corresponding to each of the digital numerals in the first set. A first resilient arm has one end fixably mounted relative said clock face and the other end registrable with said projections and is resiliently displaced by the projections on the first disc to audibly indicate a change in rotative position of the first disc from one digital numeral to the adjacent numeral. A similar series of projections are formed on the second disc and a second resilient arm similarly audibly indicates a change in rotative position of the second disc from one digital numeral to the next adjacent numeral. Thus, as each hour and minute hand is manually rotated, the hour associated with the position of the hour hand is numerically indicated in the clock face window and the minute associated with the rotative position of the minute hand is also numerically indicated in the window. Further, each numerical change for both the hour and minute numbers at the window is accompanied by an audible click to provide an audio-visual teaching aid. In an alternate embodiment a clock face overlay is provided which is removable and reversible, having geometric symbols on one side thereof and Roman numerals on the other side to represent the horological divisions. Windows are placed on diametrically opposite sides of the overlay in order that a window will be in proper registration regardless of which side is used.

It is therefore an object of this invention to provide an improved teaching aid for reading an horological clock which has at a fixed readout position the hour and minute numbers corresponding to the position of the hour and minute hands, respectively.

It is a further object of this invention to provide an audio-visual teaching aid for the reading of an horological clock.

Another object of this invention is to provide a teaching aid for reading of an horological clock which facilitates learning retention for the student for a number of different clock face displays.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a partial exploded view in perspective of a first embodiment of this invention;

FIG. 2 is a view in perspective of the embodiment of FIG. 1 assembled;

FIG. 3 is a section taken at 3—3 of FIG. 2;

FIG. 4 is a partial, partially broken away, exploded view in perspective of a second embodiment of this invention;

FIG. 5 is a view in perspective of the embodiment of FIG. 4 assembled;

FIG. 6 is a front elevational view of one side of an alternate clock face having Roman numerals;

FIG. 7 is a front elevational view of the reverse side of the clock face of FIG. 4 having geometric numeral symbols;

DESCRIPTION OF THE PREFERRED EMBODIMENT

Figure 8:
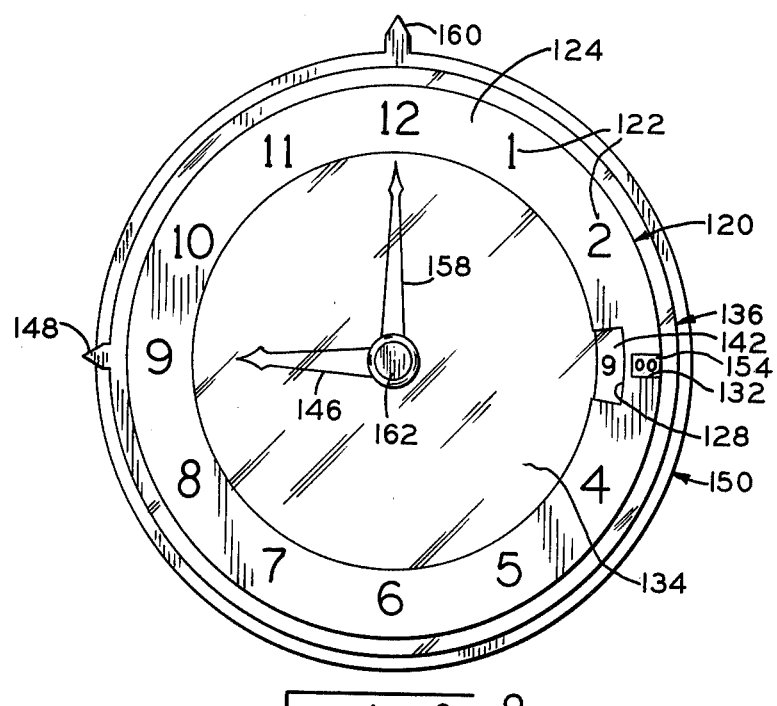
FIG. 8 is a front elevational view of a further embodiment of this invention.

Referring to FIGS. 1 to 3, a clock face 20 of a clock housing 21 has a plurality of arcuately spaced numerals 1 to 12 displayed thereon. Located centrally of the numerals 1 to 12 is a sleeve 22 affixed to face 20 and having an opening 24. An hour hand 26 is affixed to an elongate tubular shaft 28 which is rotatably mounted in opening 24 and has affixed at its distal end a disc 30. Disc 30 has numerical digital indicia of 1 to 12 arcuately spaced thereon and these indicia are registrable with a window 32 formed in face 20 as hand 26 is rotated. The indicia are spacedly positioned on disc 30 so that the digital representation of the numeral which appears in window 32 will correspond to the horological division on face 20 at which hand 26 is positioned. Also, a corresponding indicia on disc 30 will remain in the window 32 until hand 26 is aligned with the next horological division on face 20 at which time the indicia in window 32 will advance to correspond to such next division. In other words, when hand 26 is aligned with numeral 1 on face 20, the digital numeral 1 will appear in window 32 and will remain in window 32 until hand 26 is aligned with numeral 2 on face 20 at which time the digital numeral 2 will appear in window 32. This will also be true for positioning of hand 26 relative each of the numerals 1 to 12 on face 20.

Disc 30 has a plurality of radially extending projections 34, with a projection 34 provided for each digital indicia on disc 30. A first resilient arm 36 has one end 38 fixedly secured to side wall 40 of housing 21 and the free end 42 of arm 36 is registrable with projections 34 and disc 30 is rotated by hand 26. This registration will cause a momentary resilient deflection of arm 36 which will snap to its original position upon rotative passage of the projection 34 ends, thus providing an audible indication when a numeral change occurs in window 32. This alerts the student to the change and intensifies the learning process.

A minute hand 42 is affixed to a second elongate shaft 44 which extends within opening 46 of tubular shaft 28 and is rotatably mounted therein. The distal end of shaft 44 is affixed to a second disc 48 which is incrementally larger in diameter than disc 30 and has 60 digits 00 to 59 arranged in sequence at its periphery 50. The numerals in periphery 50 extend beyond projections 34 and are registrable with a window 52 in face 20 to digitally indicate the position of minute hand 42 on face 20. As an example, if minute hand 42 is aligned with numeral 2 on face 20, the digital representation for 10 will appear in window 52 representing 10 minutes past the hour. Assuming hour hand 26 is 1/6th of the arcuate distance between numerals 1 and 2 on face 20, as it would be for 10 minutes past the hour of one, the numeral 1 would appear in the window 32 and the numeral 10 would appear in window 52, thus digitally indicating "1:10" for the placement of hands 26 and 42 to indicate the hour "1:10." For each hour and minute position of hands 26 and 42, respectively, the proper digital representation will appear in windows 32 and 52, respectively, so that the student can directly associate a digital hour and minute readout without the hand positions thus increasing the rate of the learning process.

A second resilient arm 54 is fixedly mounted at end 56 to wall 40 and the free end 58 of arm 54 is in registration with a plurality of radially extending projections 60 on wheel 48. There is a projection 60 for each of the numerals 00 to 59 on disc 48. As disc 48 is rotated, a projection 60 end will resiliently deflect end 58 causing an audible click of arm 54, calling attention to the change in rotative position. This, as mentioned, will intensify the learning process.

A hand 68 for indicating seconds, which is not affixed to a disc, may be rotatably secured to shaft 44 by threading bolt 69 through opening 68a in hand 68, through washer 69a and into threaded opening 45 in shaft 44. Hand 68 would then be rotatably mounted to shaft 44 and bolt 69 would frictionally hold hand 68 in rotated position. If desired, a separate disc could be associated with hand 68 by rotatably mounting a third shaft in shaft 44 and affixing to such third shaft a third disc of larger diameter behind disc 48 which would carry on an exposed periphery the numerals 00 to 59 and adding a third window to face 20. The numerals on the third disc would register with the third window corresponding to the placement of hand 68 relative to the horological division on face 20.

A plurality of bolts 62 are received by corresponding openings in face 20 and in rear wall 64 of the clock housing 21 and each bolt 62 is engaged with a nut 66 to hold the clock elements in assembled position. Walls 40, 40a, 40b and 40c are held in assembled position when bolts 62 are in threaded engagement with their respective nuts 66.

A second embodiment is shown in FIGS. 4 and 5 and is similar in operation to the embodiment shown in FIGS. 1 to 3. The embodiment of FIGS. 4 and 5 is of a simpler, less expensive, thinner construction and is suitable for distribution to each of the learning students. A clock face 70 has a plurality of arcuately spaced numerals 1 to 12 located thereon. Centrally of numerals 1 to 12 is an opening 72 which receives and rotatably supports a ring 74 which is formed with a flange 75 affixed centrally of a first disc 76. Disc 76 has a plurality of digital representations 1 to 12 at its periphery which are registrable with a window 78 formed in face 70. An hour hand 80 is affixed to ring 74 after it has been inserted through opening 72. The registration between the digital numerals 1 to 12 on disc 76 with window 78 is such that the digital numeral corresponding to the placement of hand 80 relative the horological divisions 1 to 12 on face 70 appears in window 78, as explained for the embodiment of FIGS. 1 to 3.

The second disc 82 has a plurality of digital indicia from 00 to 59 appearing in sequence at its periphery 84. The diameter of disc 82 is incrementally larger than the diameter of disc 76 for reasons soon to be apparent. A ring 86 is formed with a flange 87 which is affixed centrally of disc 82 and is insertable in and rotatably supported by opening 74a in ring 74 and has a boss 88 which extends beyond the end of ring 74 for affixation to minute hand 90. Flange 87 is secured to the back side disc 82, which may be made of cardboard, plastic, or other like material as with adhesives. Flange 75 is secured as with adhesive to back side of disc 76 which may be of a material such as cardboard or plastic.

Discs 76 and 82 are coaxially and concentrically mounted with the diameter of disc 82 being incrementally larger than the diameter of disc 76, as mentioned, in order that the digital numerals on periphery 84 will be visable through window 92 formed in face 70. As in the embodiment of FIGS. 1 to 3, placement of the hour hand 80 and minute hand 90 relative the horological division on face 70 will cause a ditigal representation in windows 78 and 92 which will correspond to such placement. Thus, if the placement of hands 80 and 90 on face 70 are at the time 3:45, numeral 3 will appear in window 78 and the numeral 45 will appear in window 92. As shown in FIG. 5, with the hands placed at 12:00, the numeral 12 appears in window 78 and the numeral 00 appears in window 92. Referring to FIGS. 6 and 7, a reversible clock face overlay 71 is shown, on side 71a of overlay 71, the horological divisons are Roman numerals I to XII and on the reverse side 71b of overlay 71, the horological divisions are in the form of geometrical shapes, as shown in FIG. 7. In this embodiment, two sets of windows are provided; one set 100, 102 is placed in the position for digital readout for placement of the hands relative to the Roman numeral divisions and a second set of windows 104, 106 is placed for digital readout of placement of the hands relative the geometrical shapes on face 71b and shown in FIG. 7. In these embodiments, a cutout 108 is formed in the face so that when the hands are in the 12:00 position, the face may be removed with the hands passing through cutout 108, reversed, and replaced on the clock with the hands again passing through cutout 108. Clips, or other suitable fasteners, not shown, may be used to affix overlay 71 to the clock face. Thus, the student may be taught to tell time with various clock faces, thus making more thorough and comprehensive the learning process.

Figure 9:
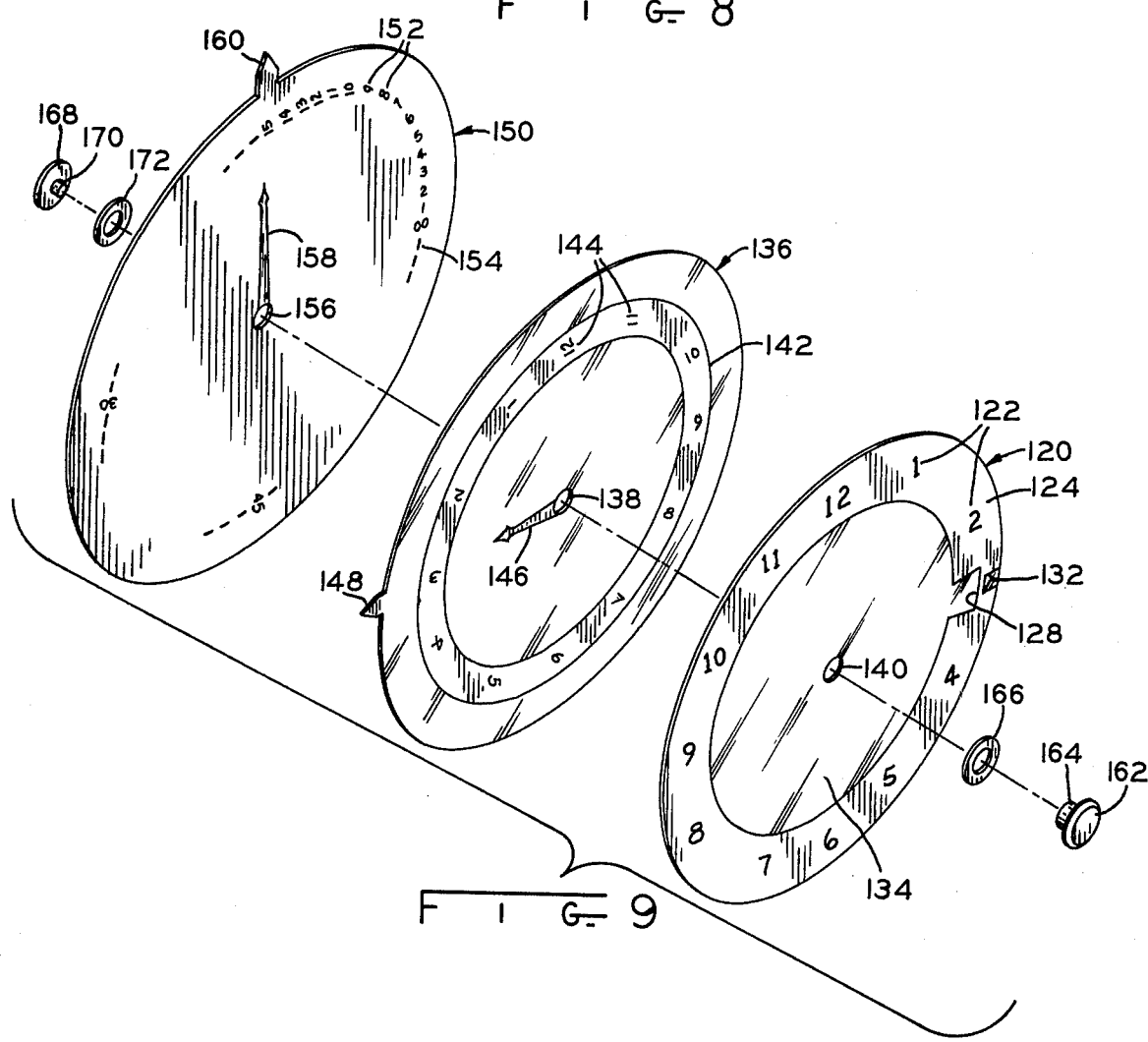
FIG. 9 is an exploded view in perspective of the embodiment of FIG. 8.

Referring now to FIGS. 8 and 9, a further embodiment is shown which is substantially flat in construction and inexpensive of manufacture, thereby making it suitable for distribution to each individual student. A clock face 120 has horological numerals 122 (1 to 12) equidistantly spaced about an annular opaque strip 124 which may be made of a stiff cardboard or other suitable inexpensive material. An arcuate opening on the inner periphery of strip 124 defines a window 128 and an arcuate opening formed in the outer periphery of strip 124 forms a window 132. Face 120 has a stiff, transparent disc 134, which may be of a plastic material, is affixed, as with transparent adhesive, to strip 124.

A stiff transparent disc 136, which may be of a plastic material, having a diameter an increment larger than face 120 is positioned immediately behind face 120 and has a central opening 138 registrable with a central opening 140 in disc 134. An opaque annular strip 142 is concentrically affixed to disc 136 and has equidistantly placed thereon hour numerals 144 (1–12). The diameter of strip 142 corresponds to twice the radius of window 128 and numerals 144 are oriented so that numerals 144 are registrable with, and readable through, window 128. An opaque hour hand 146 is affixed to, or printed on, disc 136 and radially extends from opening 138. A tab 148 is in radial alignment with hand 146 and radially extends from the circumference of disc 136.

A disc 150 made of a thin, stiff material such as cardboard, has printed thereon 60 (00 to 59) horological minute divisions 152 equidistantly spaced on circular periphery 154. The diameter of periphery 154 is an increment larger than the outer diameter of strip 142 and corresponds to twice the radius of window 132 and numerals 152 are oriented so that they are registrable with and readable through window 132. Disc 150 has a central opening 156 formed therein and an opaque minute hand 158 extending radially from opening 156 is affixed or printed on disc 150. A tab 160 is radially aligned with hand 158 and radially extends from the circumference of disc 150.

In assembling the embodiment of FIGS. 8 and 9, face 120, and discs 136 and 150 are placed one behind the other in contiguous relation with openings 140, 138 and 156 being aligned. Button 162 has an internally threaded boss 164 which is inserted through washer 166 and openings 140, 138 and 156. A button 168 having an externally threaded boss 170 is inserted through washer 172 and threadedly engaged in boss 164. In assembled relation, face 120, disc 136, and disc 150 are relatively rotatable. Hands 146 and 158 are visible through disc 134.

In operation of the embodiment of FIGS. 8 and 9, the hour tab 148 is manually engaged and rotatably moved relative face 120 until the hour hand is placed opposite relative the divisions 122 as desired, and in FIG. 8 it is shown placed opposite the numeral 9. In this position, the digital numeral 9 appears in window 128, digitally indicating the horological position of hand 146. Minute tab 160 is manually engaged to rotatably move disc 150 relative face 120 until minute hand 158 is placed at its desired position and in FIG. 8 is shown placed opposite the numeral 12 at which time the minute numeral "00" appears in window 132, thus digitally indicating "9:00" in windows 128 and 132. In like manner, the numeral corresponding to the horological hour position of hand 146 will always appear in window 128 and the numeral corresponding to the horological minute position of hand 158 will always appear in window 132.

While there have been described above the principles of this invention in connection with specific apparatus, it is to be clearly understood that this description is made only by way of example and not as a limitation to the scope of the invention.

What is claimed is:

1. A teaching aid for reading an horological clock having a rotatable minute hand and a rotatable hour hand comprising:

a clock face having horological divisions placed in sequential relation thereon;

first means for rotatably supporting an hour hand substantially centrally of said divisions and related to said divisions in sufficient proximity to visually identify the position of said hour hand relative said divisions;

second means for rotatably supporting a minute hand concentrically with and separately from said hour hand and related to said divisions in sufficient proximity to visually identify the position of said minute hand relative said divisions;

third means for digitally indicating at a predetermined display area the divisions corresponding to the respective placements of said hour and minute hands;

means for displaying said digital indications to digitally represent at said display area the division at which said hour hand is placed and the horological earlier division of the two nearest adjacent divisions between which said hour hand is placed for all horological readings and for accurate horological coordination between the hour and minute hands;

third means comprises a first disc associated and rotatable with said hour hand; said first disc carrying a first set of digital numerals corresponding to said hourly horological divisions;

said third means further comprising a second disc having a diameter an increment different than the diameter of said first disc and rotatably with said minute hand; said second disc carrying a second set of digital numerals corresponding to the horological minute divisions; said second set of numerals being registerable with said display area and being spacedly positioned on said second disc to digitally represent at said display area that division at which said minute hand is placed for all horological readings;

said first disc having a radially extending projection corresponding to each of said digital numerals in said first set;

a first resilient arm having one end fixedly mounted relative said clock face, and the other end of said first arm being registerable with said projections to resiliently bear against said first disc projections thereby audibly indicating change in rotative position of said first disc from one digital numeral to a next adjacent numeral.

2. The apparatus of claim 1 wherein said second disc has a radially extending projection corresponding to each of said digital numerals in said second set;

a second resilient arm has one end fixedly mounted relative said clock face, and the other end of said second arm being registerable with said projections to resiliently bear against said second disc projections thereby audibly indicating change in rotative position of said second disc from one digital numeral to a next adjacent numeral.

3. A teaching aid for reading an horological clock having a rotatable minute hand and a rotatable hour hand comprising:
- a clock face having horological divisions placed in sequential relation thereon;
- first means for rotatably supporting an hour hand substantially centrally of said divisions and related to said divisions in sufficient proximity to visually identify the position of said hour hand relative said divisions;
- second means for rotatably supporting a minute hand concentrically with and separately from said hour hand and related to said divisions in sufficient proximity to visually identify the position of said minute hand relative said divisions;
- third means for digitally indicating at a predetermined display area the divisions corresponding to the respective placements of said hour and minute hands;
- means for displaying said digital indications to digitally represent at said display area the division at which said hour hand is placed and the horological earlier division of the two nearest adjacent divisions between which said hour hand is placed for all horological readings and for accurate horological coordination between the hour and minute hands;
- said clock face comprising a transparent first disc having an aperture centrally thereof;
- said first means comprising a transparent second disc one of an hour hand and a minute hand positioned nextly adjacent to the backside of said clock face;
- said second means comprising a third disc having positioned nextly adjacent said first disc; an hour hand configuration being on one of said second and third disc and a minute hand configuration being on the other of said second and third disc; said hour and minute hands being viewable through said first and second disc;
- an opaque annular strip formed on said first disc; said display area comprising first and second window areas formed in said strip at first and second radii respectively from said aperture;
- a first annular array of substantially equidistantly spaced first set of numerals in chronological order corresponding to hour horological divisions being on said disc having the hour hand thereon;
- the diameter of said first annular array corresponding to the diameter of the opaque strip and said first radius so that the numerals in said array are registerable in said first window area;
- a second annular array of substantially equidistantly spaced second set of consecutive numerals in chronological order corresponding to minute horological divisions being on that disc having the minute hand thereon;
- the diameter of said second annular array being an increment different than the diameter of said first annular array and corresponding to said second radius so that said second set of numerals is registerable in said second window area adjacent the first set of numerals in said first window area;
- the numerals in said first array being spacedly positioned in said first array and said first window area being of a circumferential length to digitally represent at said first window area and viewable therethrough a division at which said hour hand is placed and the horological earlier division of the two nearest adjacent divisions between which said hour hand is placed;
- the numerals in said second annular array being spacedly positioned in said array and said second window area being of a circumferential length to digitally represent at said second window area and viewable therethrough the minute hand placement relative said clock face.

* * * * *